(12) United States Patent
Hoashi

(10) Patent No.: US 7,756,638 B2
(45) Date of Patent: Jul. 13, 2010

(54) MOBILE TERMINAL DEVICE AND PROGRAM

(75) Inventor: Hironobu Hoashi, Ome (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 409 days.

(21) Appl. No.: 11/891,123

(22) Filed: Aug. 9, 2007

(65) Prior Publication Data

US 2008/0065326 A1 Mar. 13, 2008

(30) Foreign Application Priority Data

Sep. 13, 2006 (JP) .............................. 2006-247645

(51) Int. Cl.
*G01C 21/30* (2006.01)
(52) U.S. Cl. .................. 701/211; 348/14.01; 455/575.3
(58) Field of Classification Search ............. 348/14.01; 455/575.3; 701/211
See application file for complete search history.

(56) References Cited

U.S. PATENT DOCUMENTS

| 7,565,186 | B2 * | 7/2009 | Okuzako et al. | 455/575.3 |
| 2003/0103002 | A1 | 6/2003 | Hasebe et al. | |
| 2004/0048620 | A1 | 3/2004 | Nakahara et al. | |
| 2005/0055161 | A1 * | 3/2005 | Kalis et al. | 701/213 |
| 2009/0009477 | A1 * | 1/2009 | Yukawa et al. | 345/168 |

FOREIGN PATENT DOCUMENTS

| CN | 1482434 | 3/2004 |
| CN | 2662553 | 12/2004 |
| CN | 1784047 | 6/2006 |
| JP | 2002-058057 | 2/2002 |
| JP | 2002-108531 | 4/2002 |
| JP | 2002-185585 | 6/2002 |
| JP | 2002-281131 | 9/2002 |
| JP | 2004-028854 | 1/2004 |
| JP | 2005-274293 | 10/2005 |
| JP | 2005-300896 | 10/2005 |
| JP | 2006-003269 | 1/2006 |
| JP | 2006-105640 | 4/2006 |
| KR | 1020030021783 | 3/2003 |
| KR | 1020060078076 | 7/2006 |

OTHER PUBLICATIONS

Office Action dated May 19, 2008 issued for the counterpart Korean patent application (3 pgs.).
Office Action dated Jun. 10, 2008, issued for the counterpart Japanese Patent Application 2006-247645 (2 pages).

* cited by examiner

*Primary Examiner*—Mark Hellner
(74) *Attorney, Agent, or Firm*—Cohen Pontani Lieberman & Pavane LLP

(57) ABSTRACT

A control unit obtains a current position of a mobile phone by using a GPS receiver during the operation of the navigation function, while detecting a style of a device body based on detection of an opening/closing sensor. The control unit determines whether to perform route guidance or to perform direction guidance based on the detected style of the mobile phone. When the mobile phone is in "open style", the control unit displays a detailed navigation screen including route indicating map images on a main display, while displaying a simple direction guidance on a sub display when the mobile phone is in "closed style".

9 Claims, 8 Drawing Sheets

OPEN STYLE

CLOSED STYLE

**SIMPLE NAVIGATION SCREEN
(DIRECTION GUIDANCE)**

MOBILE TERMINAL DEVICE AND PROGRAM

BACKGROUND OF THE INVENTION

1. Field of the Invention

The present invention relates to a mobile terminal device having a navigation function for guiding a user to a destination, and a program.

2. Description of the Related Art

A known mobile phone having a navigation function generally uses GPS (Global Positioning System) or the like to recognize current position, and displays the current position by a marking on a displayed map. Such the mobile phone is disclosed in a reference, for example, Unexamined Japanese Patent Application Publication No. 2005-274293.

Those mobile phones with such the navigation functions have problems. One of these problems is about incurrence of communication fees for using the GPS or downloading map images. Another problem is about increase of power consumption caused by the image processing for displaying guidance images.

To solve such the problems, some devices employ a technique for automatically turning off the guidance display after an elapse of a predetermined time. However, it may be inconvenient because guidance is not always available.

Meanwhile, demand for detailed guidance (such as route guidance) depends on a concerned situation. When a course is simple, e.g. when the travel is continuously along a main street, the detailed guidance display will not be necessary. On the other hand, when a course is complicated, e.g. when the travel is by turning down alleys many times, the detailed guidance display will be required.

Though such the detailed guidance may be helpful, guidance images may be confused. But if the display guidance has simple contents, such display contents can be understood instantaneously and intuitively.

An object of the present invention is to provide a simple navigation screen display with improved convenience, in a mobile terminal device having a navigation function.

SUMMARY OF THE INVENTION

In order to achieve the above objective, a mobile terminal device having a navigation function according to a first aspect of the present invention comprises:

a direction detection unit for detecting a direction of the mobile terminal device;

a position detection unit for detecting a current position of the mobile terminal device;

a style detection unit for detecting a style of the mobile terminal device which is variable by movable casing;

a display control unit for controlling one or more display units so as to be switched to display either one of a detailed navigation screen showing a route from a current position to a designated destination, or a simple navigation screen showing a direction toward the destination with respect to the current position, in accordance with the style detected by the style detection unit; and a direction calculation unit for calculating the direction to the destination with respect to the current position detected by the position detection unit in accordance with the direction detected by the direction detection unit, when the simple navigation screen is displayed by the display control unit;

wherein the display control unit generates the simple navigation screen showing the direction calculated by the direction calculation unit, and displays the generated simple navigation screen in accordance with a forward direction based on the direction of the mobile terminal device detected by the direction detection unit.

To achieve the above objective, a program according to a second aspect of the present invention is a program for causing a computer configured to control a mobile terminal device having a navigation function, to realize functions of:

detecting a style of the mobile terminal device which is variable by movable casing, controlling one or more display units so as to be switched to display either one of a detailed navigation screen showing a route from a current position to a designated destination, or a simple navigation screen showing a direction toward the destination with respect to the current position, in accordance with the detected style;

calculating a direction to the destination with respect to the current position of the mobile terminal device, in accordance with the detected direction of the mobile terminal device, when the simple navigation screen is to be displayed;

generating the simple navigation screen showing the calculated direction, and displaying the generated simple navigation screen in accordance with a forward direction based on the direction of the mobile terminal device.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

An embodiment of the present invention will now be described with reference to FIGS. 1 to 8.

Figure 1:
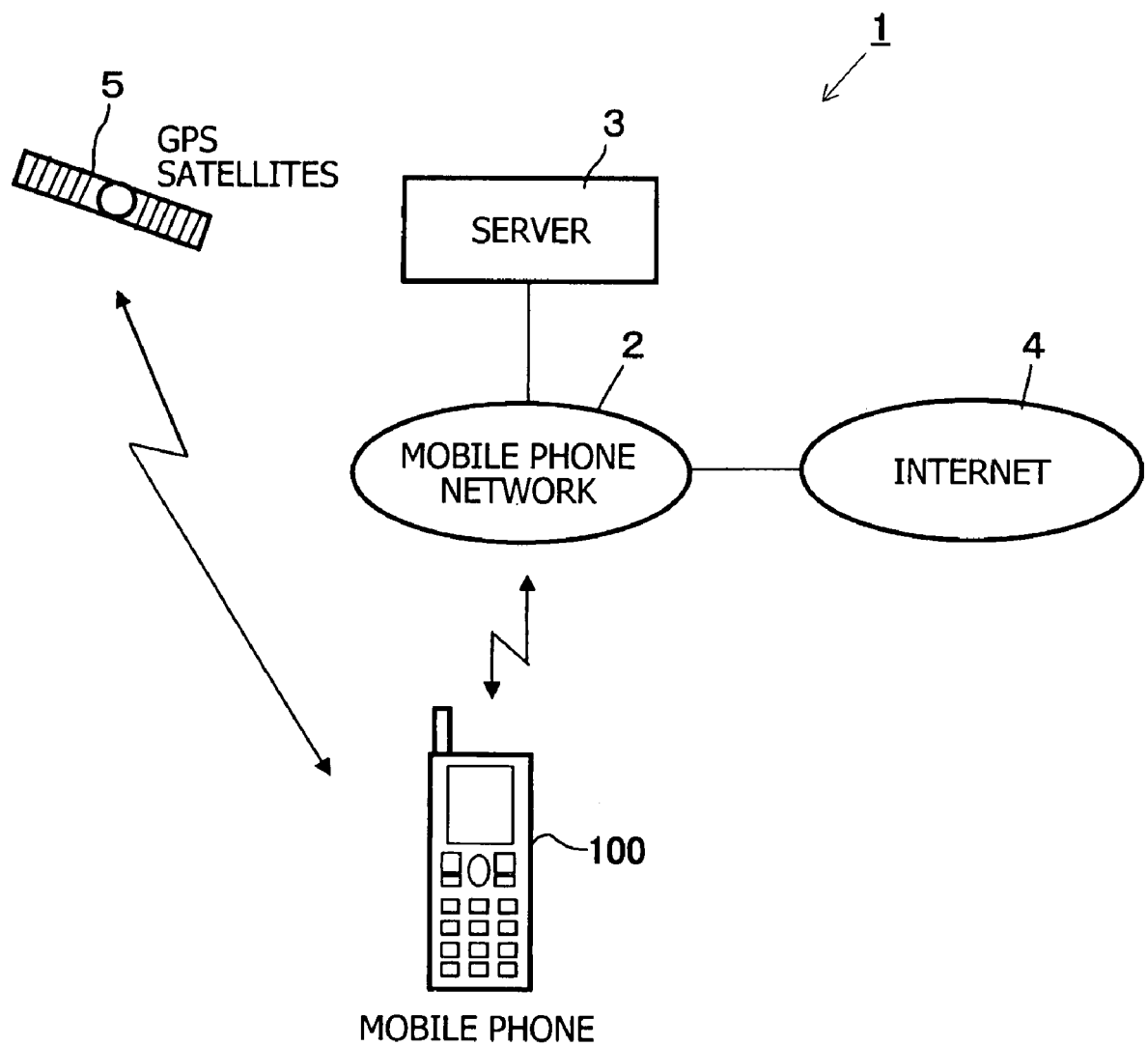
FIG. 1 is a block diagram showing a navigation system for providing a position information service available for a mobile phone being applied as a mobile terminal device of the present invention.

In this embodiment, a mobile phone is applied as a mobile terminal device of the present invention by way of example. FIG. 1 is a block diagram showing a configuration of a navigation system 1 for providing a position information service being available by the mobile phone of the present embodiment.

This navigation system 1 is, as illustrated, may comprise a communication network, such as a mobile phone network 2 and Internet 4, and a server 3 connected with these communication networks, or the like. The server 3 provides a position information service (navigation service) that guides a route between designated positions. Terminal devices such as the mobile phones access the server 3 via the mobile phone network 2 or the Internet 4 to use the position information service.

The server 3 is, for example, a server device, which is operated by a contents provider providing the navigation service, and performs a route search, etc., based on the position information obtained from the terminal, and provides the position information service by sending a map image, etc., that provides a guide for a route searched by the terminal.

The following discussion proceeds on a premise that a terminal device used by the navigation system 1 according to the present embodiment is a mobile phone described above. The mobile phone 100 according to the present embodiment is configured so that it can receive GPS signals from GPS satellites as shown in FIG. 1. By using such the GPS function, the position data representing the current position of the mobile phone 100 can be obtained. That is, the mobile phone 100 recognizes its position wherever it is.

The mobile phone 100 according to the present embodiment has a data communication function which enables data communications through the mobile phone network 2, etc, in addition to a fundamental telephony function. The navigation function showing the route and azimuth to the destination is realized by obtaining the current position of the mobile phone 100 via the GPS function, and having access to the server 3 through the data communication function. In addition, the mobile phone 100 according to the present embodiment also has an electronic compass (e-compass) function which detects the azimuth and which is used for detecting the azimuth at the time of executing the navigation function.

The configuration of such the mobile phone 100 will now be described with reference to FIG. 2. As shown in FIG. 2, the mobile phone 100 according to the present embodiment has a folding-type casing, which is capable of opening and closing, and FIG. 2A shows the appearance of the mobile phone 100 when the casing is open (hereinafter referred to as "open style"), and FIG. 2B shows the appearance of the mobile phone 100 when the casing is closed (hereinafter referred to as "closed style").

Figure 2A:
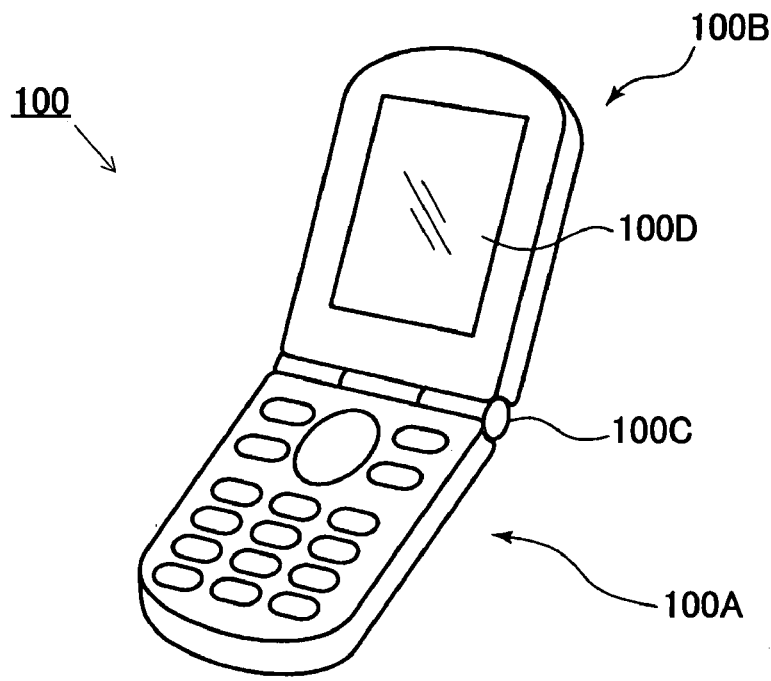
FIG. 2A is a perspective view of the exterior of a folding-type (clamshell type) mobile phone 100 being in "open style" in which a first casing 100A and a second casing 100B, each constituting the body of folding-type mobile phone 100, are open.
Figure 2B:
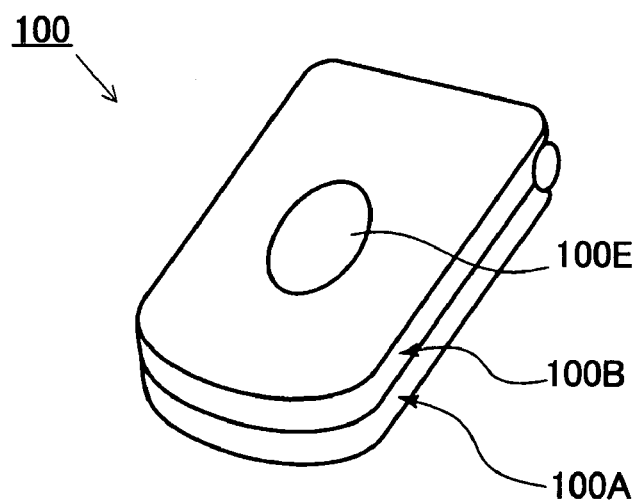
FIG. 2B is another perspective view of the exterior of the folding-type mobile phone 100 being in "closed style" in which a first casing 100A and a second casing 100B, each constituting the body of folding-type mobile phone 100, are closed.

In other words, as shown in FIG. 2A and FIG. 2B, casing of the mobile phone 100 is structured by a couple of movable casing units comprising a first casing 100A on which a keypad is provided and a second casing 100B on which a display is provided, and the first and second casings are hinged by a hinging portion 100C thus the folding-type casing is structured.

The open style as shown in FIG. 2A is a style which is employed when a user uses rime functions of the mobile phone 100. Therefore, the components necessary for using various functions of the mobile phone 100 are located on surfaces of the first casing 100A and the second casing 100B which are exposed when the mobile phone 100 is in the open style.

For example, as shown in FIG. 2A, a function keys including a power button and a menu button, and keypads for entering numbers and characters, are located on the surface of the first casing 100A. Additionally, as shown in FIG. 2A, a main display 100D which is viewable in the open style, is provided on the surface of the second casing 100B. The main display 100D may be comprised of, for example, a liquid crystal display panel or an EL display panel, or the like.

Then, once the first casing 100A and the second casing 100B are folded, the mobile phone 100 is in the closed style which is a style employed when the user carries the mobile phone 100 without operations. When the style of the mobile phone 100 changes to the closed style, a sub display 100E disposed on an outer surface of the second casing 100B becomes viewable while the main display 100D is hidden as shown in FIG. 2B. This sub display 100E may be comprised of, for example, a liquid crystal display panel, an EL display panel, or the like. Since the display size of the sub display 100E is smaller than that of the main display 100D, the sub display 100E is used for displaying minimized information. In this embodiment, the sub display 100E may have a circular shape as shown in FIG. 2B.

Figure 3:
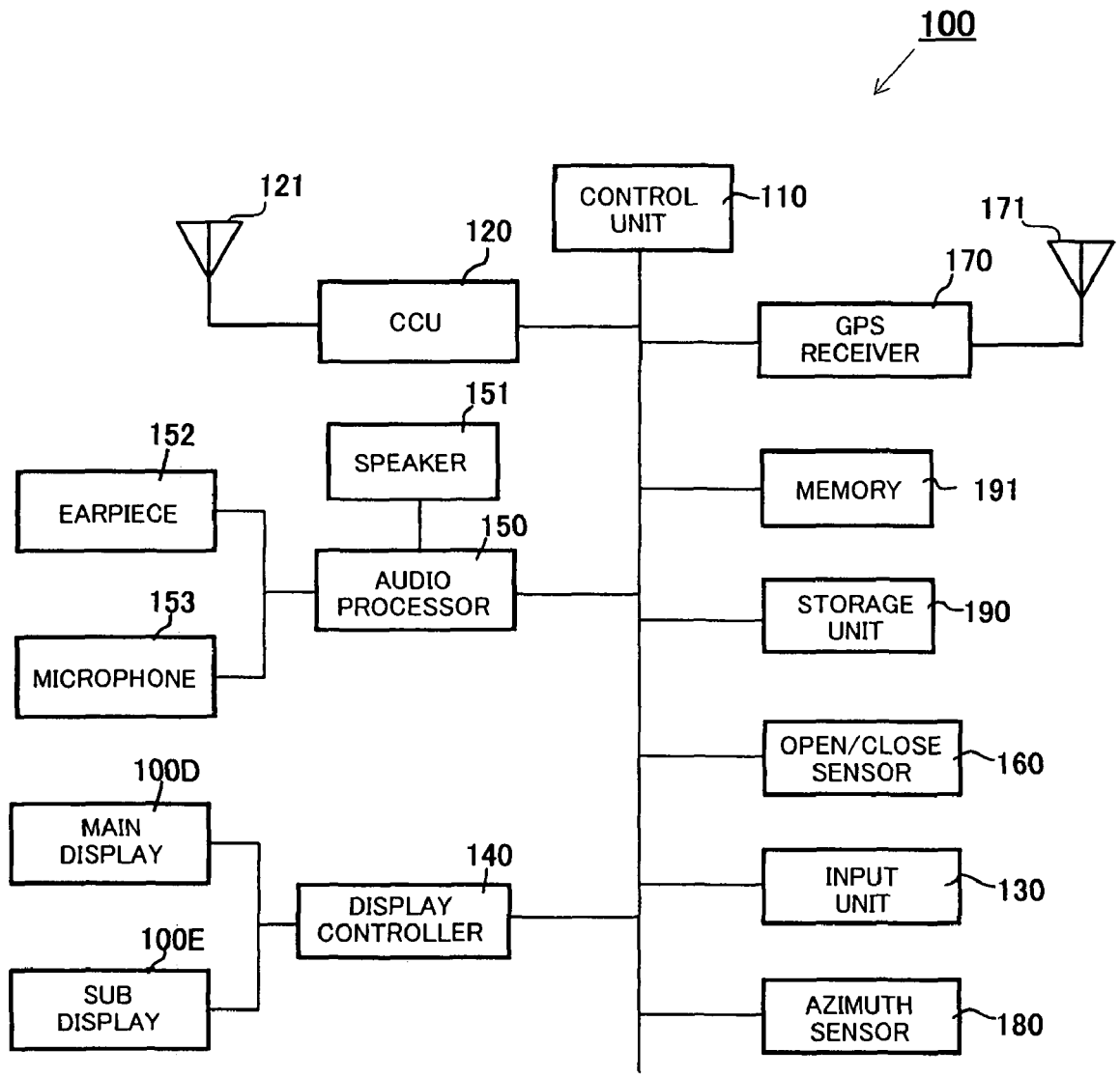
FIG. 3 is a block diagram showing fundamental components of the mobile phone 100.

Next, the internal configuration of the mobile phone 100 will now be described with reference to FIG. 3. FIG. 3 is a block diagram showing fundamental components of the mobile phone 100.

As shown in FIG. 3, the mobile phone 100 may comprises a control unit 110, a CCU (Communications Control Unit) 120, an input unit 130, a display controller 140, an audio processor 150, an open/close sensor 160, a GPS receiver 170, an azimuth sensor 180, a storage unit 190, and the like which are interconnected with each other via an information transmission channel such as a bus.

The control unit 110 may be a CPU (Central Processing Unit) which is a core central processing unit for controlling the entire components in the mobile phone 100 by executing programs stored in the storage unit 190 or the like. In this case, the control unit 110 realizes each process described later by performing various operations based on inputs from each unit being connected to the control unit 110.

The CCU (Communications Control Unit) 120 may be a baseband circuit or the like employed for controlling wireless communications based on CDMA (Code Division Multiple Access) or the like. The CCU 120 controls radio wave transmission via an antenna 121, thus wireless access to nearby base stations is realized. According to such the wireless access, the mobile phone 100 can connect to the mobile phone network 2. In this case, the CCU 120 demodulates signals in the radio wave received by the antenna 121, into baseband signals, while modulating signals provided from the control unit 110 and the like which will be released from the antenna 121. The telephony function and the data communication function of the mobile phone 100 according to the present embodiment are realized by such the operations of the CCU 120.

The input unit 130 may include function keys, keypads, and the like (hereinafter, simply referred to as "keys") which are located on a first casing 100A as shown in FIG. 2. The input unit 130 generates key input signals according to operations on the keys, and enters the key input signals into the control unit 110. According to these key input signals input to the control unit 110, dialing operation, character input operation, command input operation, and the like are realized.

The display controller 140 may be a display driver circuit which controls the main display 100D and sub display 100E with processing image signals provided from the control unit 110. According to the control operation of the display controller 140, prime screen images such as a standby screen, a menu screen, and the like are displayed on the main display 100D. Additionally, a simplified screen for displaying minimized information, for example, date and time, short messages, icons, and the like are displayed on the sub display 100E.

The audio processor 150 may be an audio codec circuit, or the like which performs an audio process mainly relating to the telephony function of the mobile phone 100. In this case, the audio processor 150 decodes audio signals received/demodulated by the CCU 120 into analog audio signals, and outputs them to a speaker 151 or an earpiece 152 for sound output, while encoding the analog audio signals input by a microphone 153 into digital audio data to be given to the CCU 120. According to such the operations of the audio processor 150, the audio related functions such as the telephony function of the mobile phone 100 are realized.

The open/close sensor 160 may be comprised of magnetic sensors, micro switches, and the like, for detecting the positioning condition of the two casings (the first casing 100A and the second casing 100B) structuring a body of the mobile phone 100. In other words, the open/close sensor 160 detects the open/close conditions of the first casing 100A and the second casing 100B, and enters detection signals into the control unit 110.

The GPS receiver 170 may be a GPS module or the like for receiving and processing GPS signals, which obtains the position data (longitude and latitude information) representing the current position of the mobile phone 100, based on the GPS signals from GPS satellites 5 received by a GPS antenna 171.

The azimuth sensor 180 may be comprised of geomagnetic sensors or the like, arranged in the mobile phone 100 for detecting the azimuth of the mobile phone 100 based on the earth magnetism. The electronic compass function of the mobile phone 100 is realized based on the detection results of the azimuth sensor 180. It is preferable that the azimuth sensor 180 is a tri-axial geomagnetic sensor having magnetic sensors that detect the earth magnetism in back/forth, right/left, and up/down directions thus being able to measure 16 azimuths.

The storage unit 190 may be a memory device such as a flash memory, a hard disk drive, or the like which stores data generated in the mobile phone 100 or used for functions of the mobile phone 100. The storage unit 190 also stores programs to be executed by the control unit 110.

Not only a built-in storage device, but also a removable portable memory or the like are applicable to the storage unit 190.

The memory 191 may be a RAM (Random Access Memory) or the like, which provides a work area or the like for the control unit 110. In other words, when the control unit 110 executes a program, programs, data, and the like are loaded to the memory 191 from the storage unit 190. After the control unit 110 processes the data loaded in the memory 191, these may be saved in the storage unit 190 if necessary.

Figure 4:
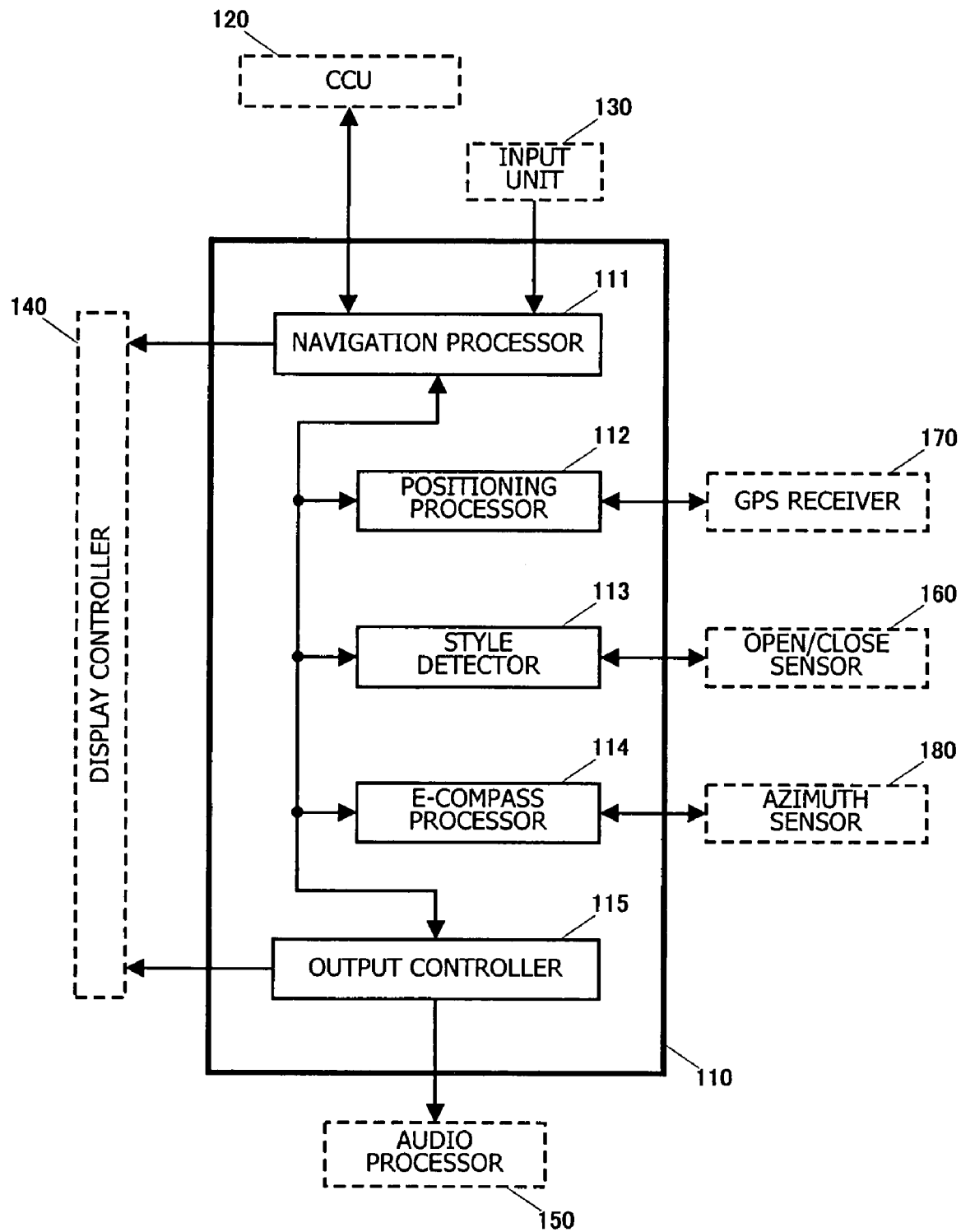
FIG. 4 is a functional block diagram showing functions that are realized by a control unit 110.

As the control unit 110 executes the programs stored in the storage unit 190, the functions that are necessary for various operations of the mobile phone 100 can be realized. The functions for the navigation function of the mobile phone 100 will now be described with reference to FIG. 4. FIG. 4 is a functional block diagram showing functions that are realized by the control unit 110.

As shown in FIG. 4, the control unit 110 functions as a navigation processor 111, a positioning processor 112, a style detector 113, an electronic compass (e-compass) processor 114, an output controller 115, and the like when the navigation function is executed.

The navigation processor 111 collaborates with the CCU 120, the input unit 130, and the like, and accesses the server device 3 providing the position information service to receive and send necessary information, when the navigation function is executed in the mobile phone 100.

In other words, the navigation processor 111 requests the server device 3 to provide a route search service by sending the current position of the mobile phone 100 obtained by the GPS function, etc., and the information showing the destination entered by a user with operating the input unit 130. The navigation processor 111 obtains navigation screen images and the like that have been sent by the server device 3 according to the request. The navigation screen in this case, may have map images including a route indicator showing a route from the current position to the destination.

The positioning processor 112 controls the GPS receiver 170 to obtain position data. In the present embodiment, the positioning processor 112 obtains the position data representing the current position of the mobile phone 100 from the GPS receiver 170 at every predetermined time interval (for example, 20 seconds interval), thus constantly recognizes the position of the mobile phone 100.

Additionally, the positioning processor 112 also controls the CCU 120 to obtain the position data representing the position of the destination from the server device 3.

The style detector 113 controls the open/close sensor 160 to detect whether the mobile phone 100 is in the open style or in the closed style, based on the detection signals from the open/close sensor 160.

The electronic compass (e-compass) processor 114 controls the azimuth sensor 180 to obtain the azimuth information showing the azimuth that has been measured by the azimuth sensor 180, and realizes the electronic compass function. In the present embodiment, the electronic compass processor 114 calculates the direction of the mobile phone 100 and the azimuth toward the specified destination based on the azimuth measured by the azimuth sensor 180.

More precisely, the direction of the mobile phone 100 means the direction of the first casing 100A. That is, the first casing 100A is held by the user when the mobile phone 100 is in the open style as shown in FIG. 2A, because the keypads and the like which are necessary for the operations are located on the first casing 100A. When using the navigation function with the open-styled mobile phone 100, the user uses the main display 100D to see the navigation screen. In this case, the first casing 100A held horizontally by the user's hand, thus the upper end of the first casing 100A faces toward the forward direction of the user.

Then, when the style of the mobile phone 100 is changed to the closed style as shown in the FIG. 2B by closing the first casing 100A, the sub display 100E will be used for showing the navigation screen. In this case, the upper end of the first casing 100A still faces toward the forward direction of the user.

Accordingly, the electronic compass processor 114 calculates the direction of the mobile phone 100 (hereinafter referred to as "device direction") by calculating the azimuth that the upper end of the first casing 100A is facing toward, based on the azimuth measured by the azimuth sensor 180.

The electronic compass processor 114 also calculates the azimuth toward the destination with respect to the device direction of the mobile phone 100, based on the current position of the mobile phone 100 and the position data about the destination that has been obtained by the positioning processor 112.

The output controller 115 controls the display controller 140, and performs display-switching between the main display 100D and the sub display 100E, according to the style of the mobile phone 100 detected by the style detector 113. The output controller 115 also generates the display image according to the intended display and provides it to the display controller 140.

In other words, when the navigation function is executed under the mobile phone 100 is in the open style as shown in FIG. 2A, the display which is viewable to a user will be the main display 100D, so the output controller 115 controls the display controller 140 so as to display the navigation screen on the main display 100D.

On the other hand, in the case of the closed style as shown in the FIG. 2B, the display viewable to a user will be the sub display 100E, so the output controller 115 controls the display controller 140 so as to display the navigation screen on the sub display 100E.

Figure 5:
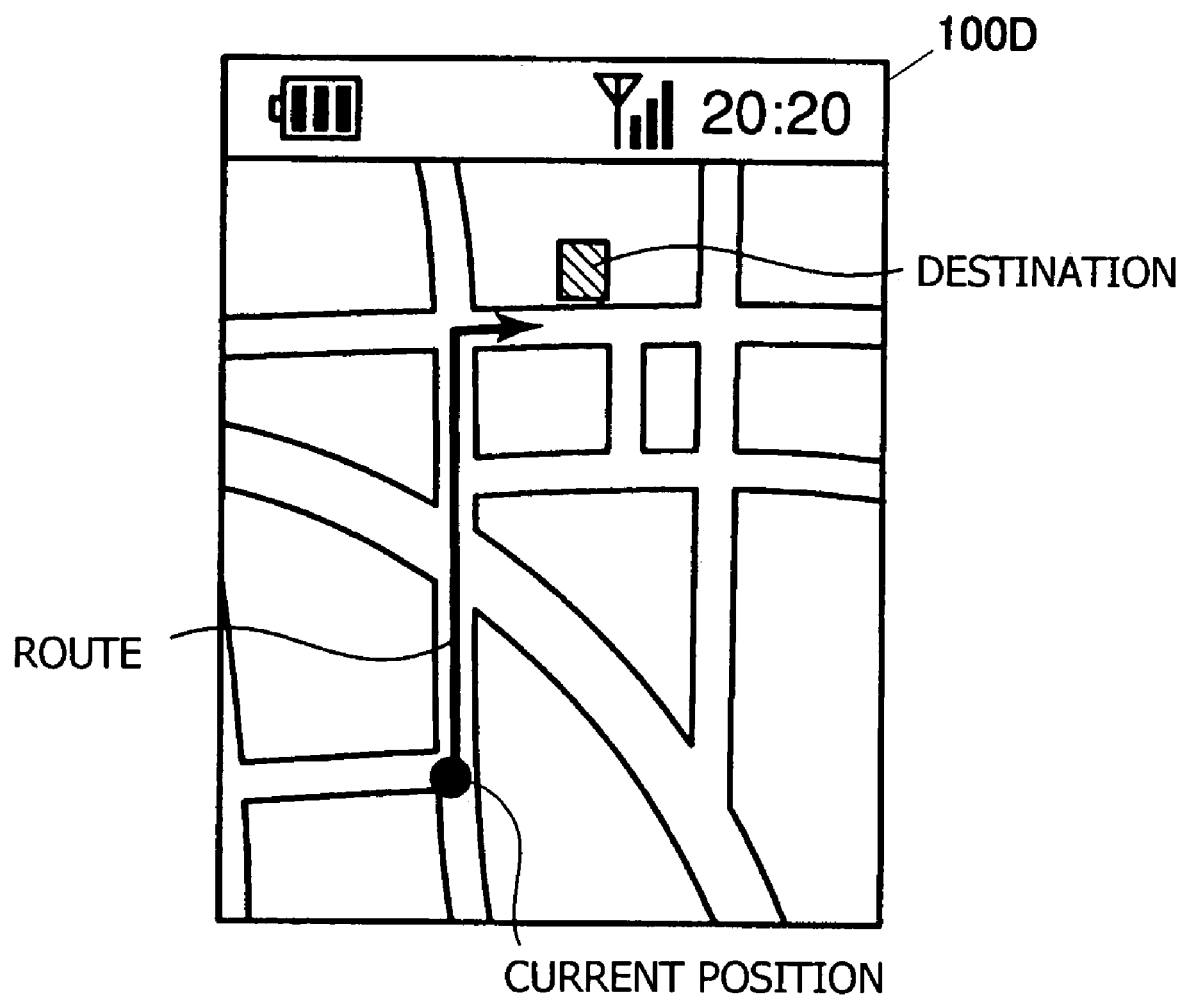
FIG. 5 is an illustration exemplifying a detailed navigation screen (route display screen) that is displayed on a main display 100D.

The navigation screen provided from the server device 3 to be displayed on the main display 100D is a detailed navigation screen (route guidance screen) including a map image as shown in FIG. 5. Therefore, the output controller 115 will control the display controller 140 such that the detailed navigation screen will be displayed on the large size main display 100D. In this case, before displaying the route guidance screen including map image on the main display 100D, the output controller 115 adjusts the direction of the screen image to be displayed so that the azimuth of the calculated device direction coincides with the same azimuth on the map to be displayed. For example, if the user is forwarding toward east, the output controller 115 adjusts the direction of the navigation screen so that east end on the map faces the upper end of the main display 100D.

Figure 6A:
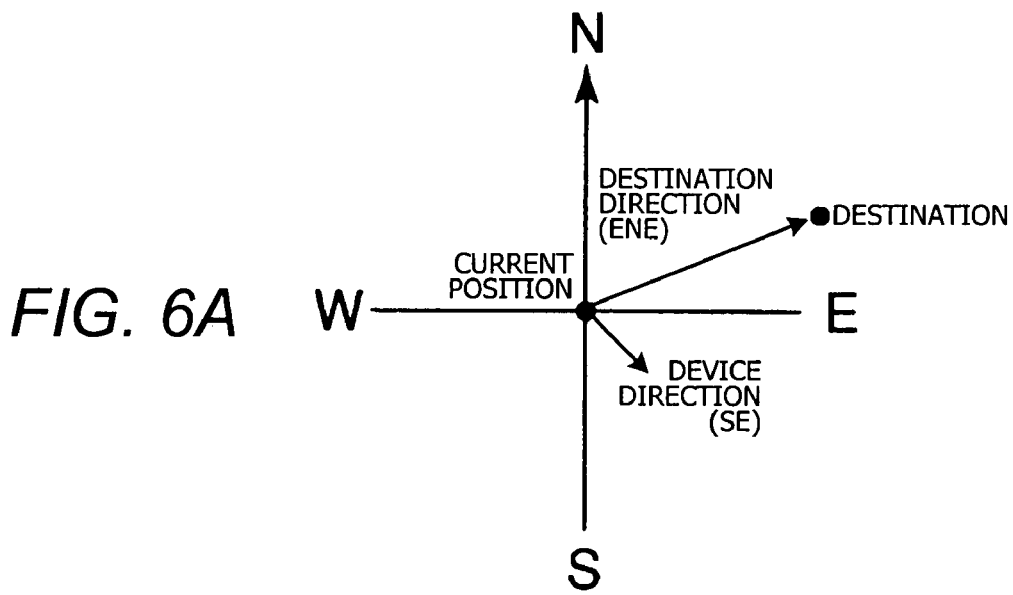
FIG. 6A is an illustration for explaining the relationship between the azimuth (device direction) measured by an azimuth sensor 180 with respect to the current position, and the azimuth of a destination.
Figure 6B:
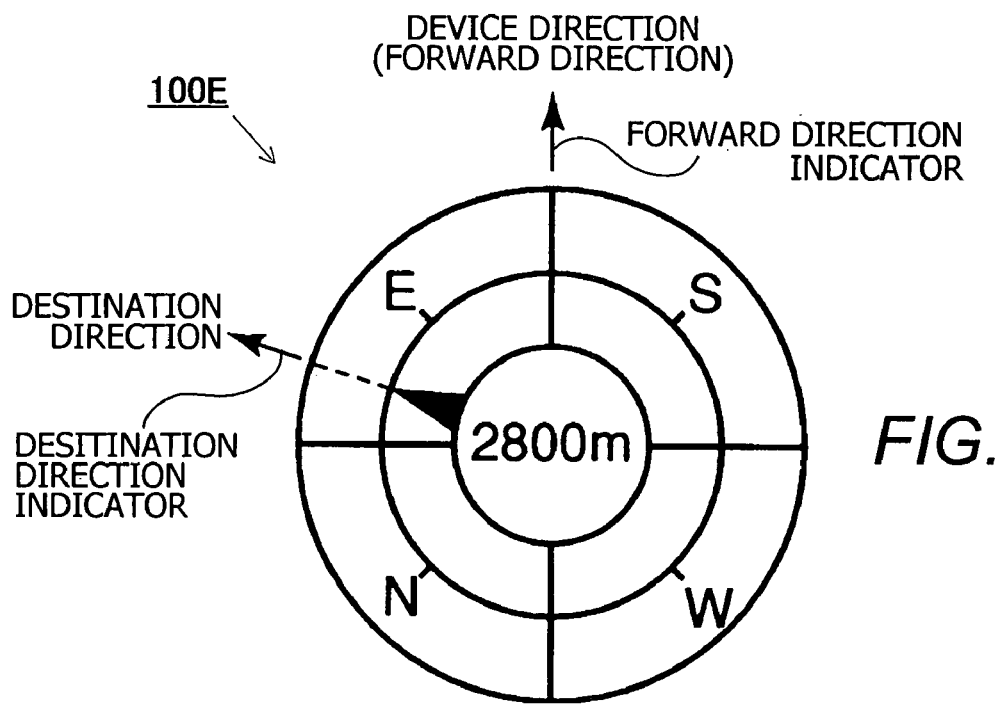
FIG. 6B is an illustration exemplifying a simple navigation screen (direction guidance screen) that is displayed on a sub display 100E.

On the other hand, when the style of the mobile phone 100 is changed to the closed style under executing the navigation function, a display that is viewable to a user will be the sub display 100E for displaying a simplified screen. In this case, the output controller 115 generates a direction guidance screen (simple navigation screen) as shown in FIG. 6B, which shows the direction toward the destination with respect to the device direction that has been calculated by the electronic compass processor 114, and controls the display controller 140 to display thus generated simple navigation screen. In this embodiment, the simple navigation screen may be shaped circular as shown in FIG. 6B.

Additionally, the output controller 115 may also control voice guidance. In this case, the output controller 115 outputs audio signals representing voice guidance to the audio processor 150, thus the voice guidance will be output from the speaker 151, while displaying the detailed navigation screen.

The description herein is provided on a premise that the above components are necessary to implement the present invention, and other components that are necessary for basic functions and additional functions as a mobile phone, are to be provided as needed.

The operations of thus structured mobile phone 100 will now be described with reference to flowcharts shown in FIG. 7 and FIG. 8. In these figures, each operation described in these flowcharts is realized by the sequential executions of the program codes stored in the storage unit 190 by the control unit 110. Additionally, the operations may be realized by real time execution of the program which is given via any network media such as a mobile telephone network 2 and Internet 4 as well as the case where such the program is supplied by any recording media.

Figure 7:
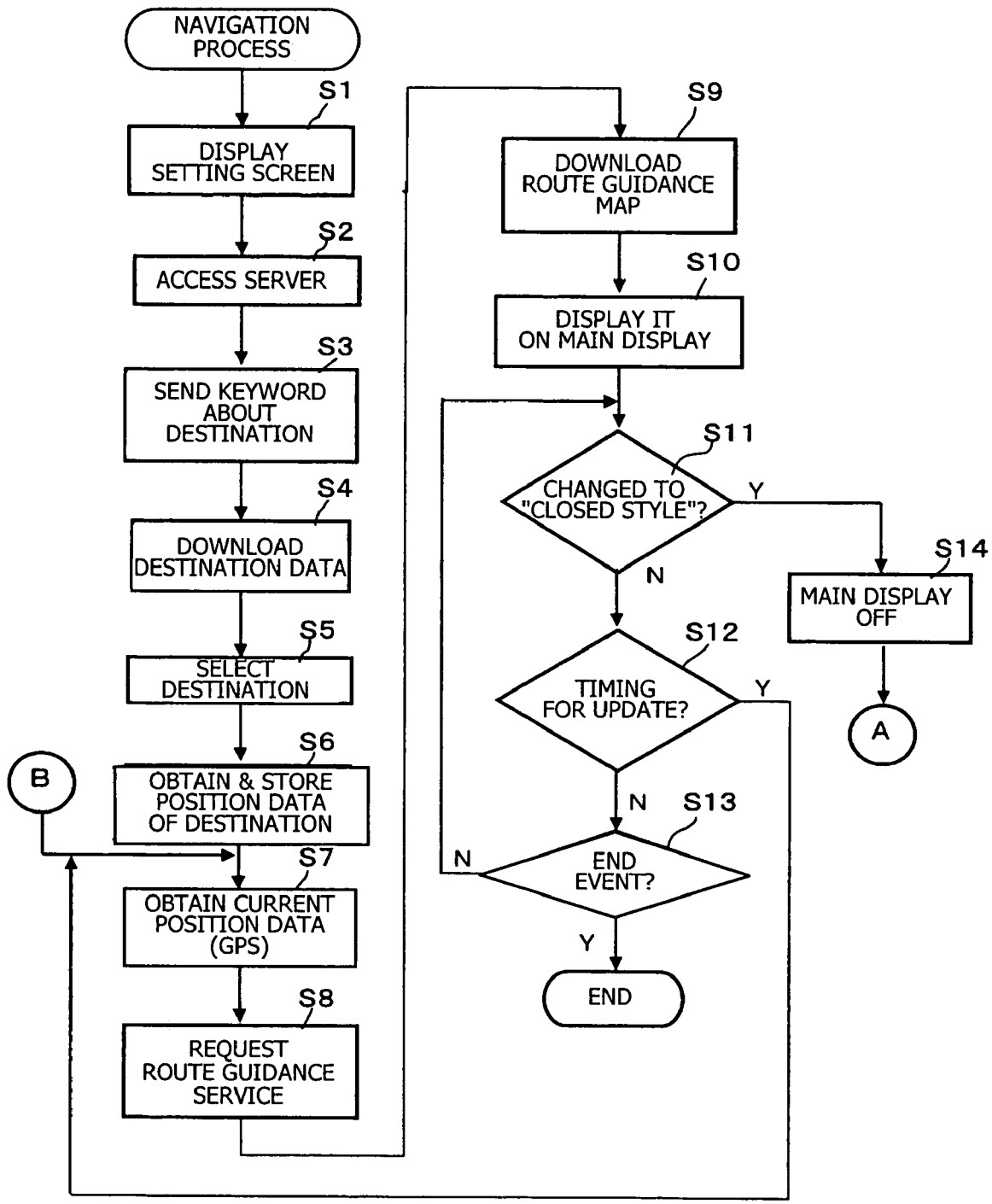
FIG. 7 is a flowchart for explaining the navigation process according to an embodiment of the present invention, which is executed to realize a navigation function of the mobile phone 100.
Figure 8:
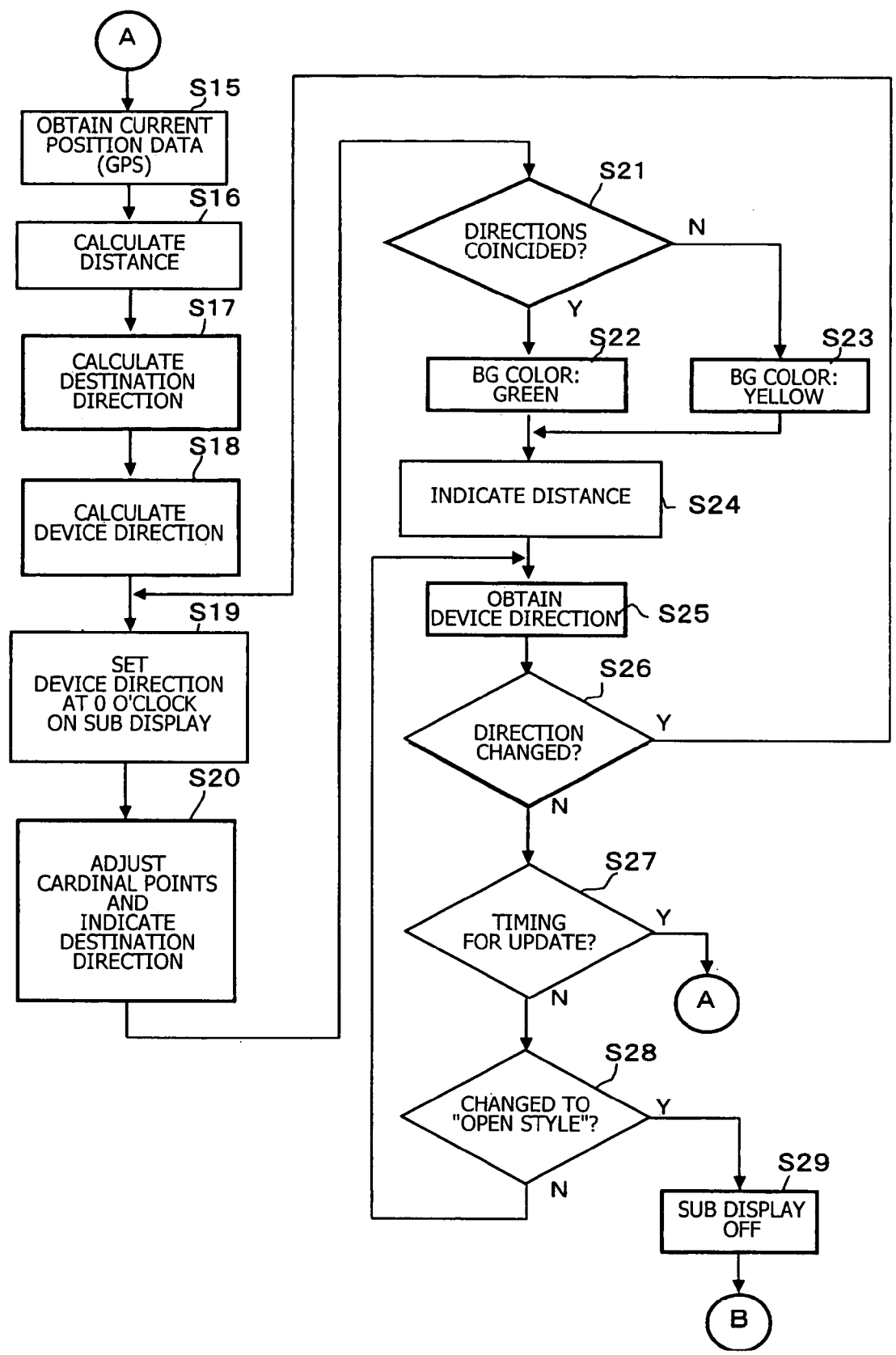
FIG. 8 is another flowchart showing the following steps of the navigation process shown in FIG. 7.

The flowcharts shown in FIG. 7 and FIG. 8 show a characteristic part of the operation (navigation function) in the present embodiment, out of the general operations of the mobile phone 100, and after the process flows in FIG. 7 and FIG. 8, operations will be performed based on the process flow of the general operations (not shown).

FIG. 7 and FIG. 8 are flowcharts for explaining "Navigation Process" which starts upon the user operation with the input unit 130 under the mobile phone 100 is in the open style. In this case, key input signals generated by the input unit 130 in accordance with the user's key operation, are entered into the control unit 110, which will lead to a program execution relating to the navigation function, and then each function component shown in FIG. 4 will be realized.

Upon commencement of the process, the navigation processor 111 and the output controller 115 will output a setting screen for the navigation on the main display 100D (Step S1). In this case, keyword(s) for specifying an arbitrary destination is entered by keypads operation performed by a user. Key input signals representing the keyword(s) are generated by the input unit 130, and then entered into the control unit 110.

Once the keyword(s) for the destination is input, the navigation processor 111 will store the relevant keyword in the memory 191, while controlling the CCU 120 to access the server device 3 (Step S2).

Once the access to the server device 3 is established, the navigation processor 111 requests the position data about the relevant destination by sending the keyword stored in the memory 191 to the server device 3 (Step S3).

In the server device 3, various kinds of information relating to the navigation is accumulated in a database, and the information showing the relevant destination is searched from the database, based on the keyword that has been sent from the mobile phone 100. The server device 3 sends the searched destination information to the mobile phone 100 in order to confirm if the searched destination information is a destination which is requested by the user of the mobile phone 100.

In this case, the CCU 120 receives the destination information and enters it in the control unit 110, thus the destination information is downloaded (Step S4). The downloaded destination information will be listed in the setting screen by the output controller 115. Any given candidate will be selected and specified from this list through the keypad operation performed by the user.

Once the key input signals according to this selection operation are entered in the control unit 110 from the input unit 130 (Step S5), the navigation processor 111 controls the CCU 120 to obtain the position data (longitude and latitude information) about this potential selection (destination) from the server device 3. The navigation processor 111 temporarily memorizes the position data about the designated destination in the work area of the memory 191 (Step S6).

Once the position data about the destination is obtained, the positioning processor 112 controls the GPS receiver 170 to obtain the position data representing the current position of the mobile phone 100 (Step S7). The positioning processor 112 notifies thus obtained current position to the navigation processor 111. The navigation processor 111 requests the server device 3 to send a route from this current position to the destination (Step S8).

In this case, the server device 3 performs a route search based on request, and sends map data showing the searched route to the mobile phone 100. Once the navigation processor 111 receives by downloading the map data including the route guidance sent by the server device 3 (Step S9), the output controller 115 outputs this map image including the route guidance as a detailed navigation screen on the main display 100D (Step S10).

FIG. 5 exemplifies the detailed navigation screen displayed on the main display 100D. As shown in FIG. 5, the detailed navigation screen indicates the current position and destination on the map, while showing a route guidance image indicating the route from the current position to the destination with a bold line.

Before the display operation, the output controller 115 adjusts the direction of the navigation screen so that the azimuth on the map in the navigation screen coincides with the azimuth of the device direction (that is, the forward direction) calculated by the electronic compass processor 114. The output controller 115, in addition to displaying thus adjusted navigation screen, may also controls the audio processor 150 to output voice guidance such as instructions for right/left turn according to the current position.

In this condition, the style detector 113 obtains detection signals from the open/close sensor 160 constantly to detect whether the style of the mobile phone 100 is changed to the "closed style" from the "open style" (Step S11), and then notifies the positioning processor 112 of the detection result.

If it remains in the "open style", the positioning processor 112 will detect whether the specified time (e.g. 20 seconds, etc.) has been passed after the current position is obtained from the GPS receiver 170, in other words, whether it falls on the timing for updating the position data representing the current position of the mobile phone 100 (Step S12).

If it is not the timing for updating the position data (Step S12: No), that condition will be notified to the navigation processor 111. In this case, the navigation processor 111 determines whether any end event indicating the end of the navigation process has occurred or not (Step S13).

If no end event occurs (Step S13: No), the process flow goes back to step S11 and operations at steps S11 to S13 are performed repeatedly.

On the contrary, if it is determined that it is the timing for updating the position data (Step S12: Yes), the above Steps S7 to S13 will be sequentially executed. While the mobile phone 100 is in the "open style", the positioning processor 112 obtains new current position data from the GPS receiver 170 whenever the timing for updating the position data arrives.

Then, the navigation processor 111 downloads another map image including updated route indication based on the newly obtained information from the server device 3. The output controller 115 sequentially updates the navigation screen that has been displayed on the main display 100D by rewriting the screen images into the newly downloaded images. In this case, the map image having the latest route indication, which has been downloaded most recently, is stored in the memory 191.

Accordingly, the detailed navigation screen provided from the server device 3, is displayed on the main display 100D, when a user uses the navigation function under the mobile phone 100 is in the open style.

Usually, the user of the mobile phone 100 uses the navigation function as in the manner described above with the open styled mobile phone 100. However, if the route on the user is simple (for example, going along a large straight street for a while, or the like) such the detailed navigation may not be always necessary. In such a case, the user may change the style of the mobile phone 100 to "closed style" because the closed style is easier to carry the mobile phone 100.

In this case, the style detector 113 determines that the "open style" has been changed to the "closed style", based on the detection signals from the open/close sensor 160 (Step S11: Yes). In this case, the style detector 113 notifies it to the output controller 115 and the positioning processor 112.

The output unit 115 controls the display controller 140 to turn off the main display 100D by, for example, stopping the power supply thereto (Step S14), which leads to the end of navigation display using the main display 100D.

That is, when the style of the mobile phone 100 is changed to "open style" to "closed style" during the execution of the navigation function, the active display for the navigation will be switched to the sub display 100E. The process for this case will now be described with reference to the flowchart shown in FIG. 8.

At this stage, the positioning processor 112 that has been notified of the style change from the style detector 113, newly obtains current position data by controlling the GPS receiver 170 (Step S15), and notifies the obtained current position data to the navigation processor 111.

The navigation processor 111 calculates the distance from the current position to the destination, based on the notified current position and the destination position that is temporarily memorized in the memory 191 (Step S16). In this case, the direct distance from the current position to the destination may be calculated, but by referring to the previously obtained map having the route and the scale thereof, and obtaining the traveling distance while tracing the route on the map, the movement distance along the route may be calculated based on this traveling distance and scale of the map.

Once the distance between the current position and the destination is calculated, the navigation processor 111 notifies the current position and the calculated distance to the electronic compass processor 114.

Upon the notification from the navigation processor 111, the electronic compass processor 114 calculates the azimuth toward the destination (hereinafter referred to as "destination direction") with respect to the current position, using the current position and the destination position (Step S17). An example of the destination direction calculated by the electronic compass processor 114 will now be explained with reference to FIG. 6A. FIG. 6A illustrates the relationship between the azimuth that has been measured by the azimuth sensor 180 based on the current position (device direction), and the azimuth toward the destination. FIG. 6A exemplifies a case where azimuth "east-northeast" has been calculated as the destination direction.

Next, the electronic compass processor 114 accesses the azimuth sensor 180, and based on the measured azimuth, calculates the direction of the first casing 100A (device direction) (Step S18).

The electronic compass processor 114 outputs into the output controller 115, the distance from the current position notified by the navigation processor 111 to the destination, the destination direction calculated in Step S117, and the device direction calculated in Step 18.

The output controller 115 generates the simple navigation screen (direction guidance screen) to be displayed on the sub display 100E, based on the distance that has been output from the electronic compass processor 114, the destination direction, and the device direction. An example of the simple navigation screen displayed on the sub display 100E is shown in FIG. 6B.

As illustrated, the destination direction that is based on the azimuth that has been measured by the azimuth sensor 180 (device direction), is displayed in a manner of guidance on the sub display 100E.

In the case of having the relationship between the device direction and the destination direction as shown in FIG. 6, the device direction (the direction of the first casing 100A) is "southeast" while the destination direction is "east-northeast". In this case, the sub display 100E displays the direction guidance screen as shown in FIG. 6B, on which cardinal points (NSEW) are displayed with a plurality of concentric circles with intersecting linings, one of which is a vertical line between "0 o'clock" position and "6 o'clock" position of a clock face, and another of which is a horizontal line between "3 o'clock" position and "9 o'clock" position, for indicating back/forth and right/left directions based on the device direction (forward direction).

The output controller 115 displays the simple navigation screen on the sub display 100E so that the forward direction points "0 o'clock" position based on the calculated device direction. In this case, the direction of the vertical line between 0 o'clock position and 6 o'clock position coincide with the forward direction, so the output controller 115 displays an arrow image indicating the forward direction (forward direction indicator) at the upper part of the screen, as shown in FIG. 6B. Additionally, the calculated distance from the current position to the destination is numerically displayed in the center of the navigation screen (2800m, for example, in FIG. 6B).

In other words, the output controller 115 generates a forward direction indicator image at "0 o'clock" position on a virtual clock face corresponding to the circular sub display 100E (or the circular simple navigation screen), and sets the calculated device direction (forward direction) with the 0 o'clock direction (Step S19).

The electronic compass processor 114 also calculates constantly the difference of the azimuth toward the destination from the device direction as a relative direction, and outputs it to the output controller 115. The output controller 115, as shown in FIG. 6B, adjusts the cardinal points (NSEW) on the sub display 100E, based on the calculated relative direction, while displaying the arrow image (destination direction indicator) indicating the destination direction from the current position, on the sub display 100E (Step S20).

Once such simple navigation screen (direction guidance screen) is displayed, the electronic compass processor 114 detects whether or not the device direction and the azimuth of the destination coincide in respect of the azimuth (Step S21).

At this stage, depending on whether or not the device direction and the azimuth of the destination are coincide in respect of the direction, the direction which a user should proceed to, is provided by changing the display color of the simple navigation screen (direction guidance screen).

In this case, the electronic compass processor 114 constantly detects whether or not the device direction and azimuth of the destination coincide with each other, and if the device direction and the azimuth of the destination coincide in respect of the direction (Step S21: Yes), the condition is notified to the output controller 115.

Meanwhile, the electronic compass processor 114 may judge that the device direction and the azimuth of the destination coincide, in the case where an angle between a direction which is one of 16 azimuths measurable by the azimuth sensor 180 being approximated to the destination direction and the device direction is less than a redetermined threshold angle.

If the coincidence of the azimuth is notified from the electronic compass processor 114, the output controller 115 sets the background color (BG color) of the simple navigation screen displayed on the sub display 100E, for example, green to inform that the forward direction of the user is correct (Step S22).

On the other hand, if the coincidence of the azimuth is not notified (Step S21: No), the output controller 115 sets the background color (BG color) of the simple navigation screen displayed on the sub display 100E, for example, yellow to warn that the forward direction of the user is wrong (Step S23).

At the same time, the navigation processor 111 constantly calculates the distance from the current position to the destination, and outputs it into the output controller 115. The output controller 115 displays the distance to the destination in the center of the simple navigation screen, based on the output from the navigation processor 111 (Step 24).

Meanwhile, at the time of such direction guidance using the sub display 100E, the voice guidance as performed with the navigation using the main display 100D, is not to be performed.

In this condition, the electronic compass processor 114 obtains the device direction by accessing the azimuth sensor 180 (Step S25) as needed, and determines whether the device direction has been changed by comparing the latest device direction with the device direction previously obtained (Step S26).

If the device direction has been changed (Step S26: Yes), the electronic compass processor 114 notifies it to the output controller 115. In this case, the process flow goes back to Step 19, and subsequently, the output controller 115 change the display contents of the navigation screen according to the amount of change of the device direction (Step S19 to S24).

On the other hand, if the device direction has not changed and is the same as previous one (Step S26: No), the navigation processor 111 will determine whether the predetermined time (e.g. 20 seconds, etc.) has been passed since the current position was obtained from the GPS receiver 170, in other words, if it falls on the timing for updating the position data (Step S27).

As a result, if the predetermined time has not been passed yet, that is, it is not the timing for updating the position data (Step S27: No), the style detector 113 controls the open/close sensor 160 to detect whether the style of the mobile phone 100 has been changed to the "open style" or not (Step S28).

If it is determined that the mobile phone 100 is still in the "closed style" (Step S28: No), the process flow goes back to Step S25, and subsequently the device will be in the standby state with repeating the above operations (Step S25 to S28).

Additionally, if the predetermined time has been passed, that is, it is determined that it is the timing for updating the position data (Step S27: Yes), the Steps S15 to S24 will be executed. In other words, while the navigation function is executed in the "closed style", the screen contents will be updated by rewriting the contents of the navigation screen of the sub display 100E, based on the current position newly obtained from the GPS receiver 170, whenever the timing for updating the position data arrives.

On the other hand, if it determined that the style of the mobile phone 100 has been changed from the "closed style" to the "open style" (Step S28: Yes), the style detector 113 notifies it to the output controller 115. In this case, the output controller 115 executes operations at Step S7 shown in FIG. 7 after turning off the sub display 100E by, for example, stopping the power supply thereto (Step S29).

In this case, if the current position is newly obtained in Step S7, the server device 3 will be requested to provide the navigation screen based on the obtained current position, so new map information showing the route from the updated current position to the destination will be downloaded from the server device 3. Such detailed navigation screen is displayed on the main display 100D, so in the case that the style of the mobile phone 100 is changed from the closed style to the open style during the execution of the navigation function, the display of the navigation screen is switched from the sub display 100E to the main display 100D.

As described above, in this embodiment, the control unit 110 obtains the current position from the GPS receiver 170 during the operation of the navigation function, while detecting the style of the device body by accessing the open/close sensor 160, switches a display to be used for the navigation according to the style at the time, and switches either the detailed display that guides the route from the current position to the destination, or the simple display that guides the destination direction.

In the case of the simple display, comparing the device direction (the azimuth that the device body is facing toward) that has been obtained by the electric compass, with the azimuth of the destination that has been calculated based on the current position and the destination position, then calculating the relative direction for them, and displaying it in a manner of guidance, will make it possible to see the destination direction based on the current position.

In this case, depending on whether or not the device direction and the azimuth toward the destination coincide in respect of the direction, the color of the navigation screen will be changed, so the user can see intuitively whether the forward direction is correct or wrong.

Additionally, the control unit 110 calculates the distance from the current position to the destination and performs a distance display together with the destination guidance display, which can lead to a useful guidance even in a narrow or small screen.

For switching between the detailed display and the simple display, all a user has to do is to simply change the style of the casing, so if the simple direction guidance display is specified for daily use, with switching to the detailed route guidance display temporarily on-as needed basis, it will be beneficial for reducing power consumption and communication fees.

In other words, in the case of displaying the route in a manner of guidance on the map, the map information will be obtained by downloading, but in the case of performing a direction guidance display for the destination direction, the map information will not be obtained by communication, which will make it possible to significantly save power consumption and communication fees.

A voice guidance performed along with the navigation display may be turned on/off by the change of the current style, without controlling the volume, in a certain case where the voice guidance causes problems to the third person. Such configuration provides benefit of power consumption, as well.

Meanwhile, in the embodiment described above, after obtaining the current position from the GPS receiver 170, whenever the predetermined time (e.g. 20 seconds) is passed, the current position is obtained from the GPS receiver 170, as well as the map images including the route indication, but if the mobile phone 100 has an autonomous positioning function, the continuous calculations of the position measurement may be performed on the side of the mobile phone 100, after obtaining the current position from the GPS receiver 170.

In this case, the map images including the route indication may not be downloaded while the calculation of the position by use of the autonomous positioning function, and it may be downloaded when a new current position has been obtained from the GPS receiver 170. Additionally, the subsequent new map information may be obtained by downloading when the current position reaches at the edge of the navigation screen (the edge of the map).

In the embodiment described above, the background color is changed depending on whether or not the device direction and the azimuth of the destination coincide in respect of the direction, but the display method is optional, and, for example, the coincidence/non-coincidence of the direction may be visually displayed by changing the color of the destination direction indicator. In the case that the sub display 100E is a black and while display, the coincidence/non-coincidence of the direction may also be displayed, for example, by highlighting or blinking the destination direction indicator.

Additionally, in the case that the difference between the device direction and the azimuth of the destination is large (e.g. in opposite direction), it may be warned by alarm sound or the like.

Meanwhile, in the case that the sub display 100E is a black and white display, the power consumption will be significantly reduced compared with a color display. In this case, it is not necessary to set power saving preferences for the sub display 100E, thus the navigation screen may always be displayed.

In the embodiment described above, the open/close-typed mobile phone is exemplified, but a slide-type, rotary-type, or biaxial rotary-type mobile phone are also adaptable to the present invention. In this case, it can be selectively determined which style to associate with each of the modes of display, the route guidance display and the direction guidance display.

Additionally, in the embodiment as described above, the route guidance display is performed on the main display 100D, and the direction guidance display is performed in the sub display 100E, but, for example, in a slide-type mobile phone, the route guidance display and the direction guidance display may be switched from one another on one display section. In this case, the route guidance display may be displayed in the large screen and the direction guidance display may be compactly displayed.

In the embodiment described above, the distance from the current position to the destination is calculated, and the distance is displayed together with the direction guidance, but the distance to the destination may be displayed together with the detailed guidance screen having the map images showing a route.

In the embodiment described above, a map showing a route is displayed in a manner of guidance, but the display may be simpler route guidance. Further, the voice guidance is inactivated in the case of the direction guidance display, but the frequency of the voice guidance may be controlled according to the style.

Additionally, in the embodiment described above, though it is not mentioned specifically, the present invention is not limited to the application to the navigation function for pedestrian assistance, and this mobile phone 100 may be brought into a vehicle and thereby used as a so-called car navigation device.

In addition, in the embodiment described above, the GPS receiver 170 is used, but, for example, the current position of a user may be measured by a plurality of base stations of a ground system for conducting the mobile wireless communications.

Also, in the embodiment described above, the position information about the destination is supplied from the external device, but the same information as the position information accumulated in the server device 3, may be accumulated within the mobile phone 100 itself. In this case, the position information about the specified destination can be obtained without communicating with an external source, so the position information about the destination can be obtained without any communication costs.

The mobile terminal of the present invention is not limited to the mobile phone, as it is also applicable to a mobile terminal device such as a PDA, a digital camera, a watch, and a music player even if these have the navigation function.

Not only the mobile terminal device having in advance necessary functions for achieving the present invention can be provided, but also an existing mobile terminal device is able to act as the mobile terminal device according to the present invention by applying programs for realizing the above functions by the control unit 110.

In this case, a same program as the program executed by the above control unit 110 is applied to the existing mobile terminal device, and the program is executed by a computer controlled by the relevant mobile terminal device, to thereby make such devise as to serve as a mobile terminal device having the same function as the above mobile phone 100.

Such the program may be distributed arbitrary, for example, it can be distributed by being stored in a memory media such as a CD-ROM and a memory card, as well as distributed through a communication media such as Internet by being superposed on carrier waves.

This application is based on the Japanese Patent Application No. 2006-247645 that was filed on Sep. 13, 2006, and all of the contents described in the relevant application are to be incorporated herein by reference.

What is claimed is:

1. A mobile terminal device having a navigation function, comprising:
    a direction detection unit for detecting a direction of the mobile terminal device;
    a position detection unit for detecting a current position of the mobile terminal device;
    a style detection unit for detecting a style of the mobile terminal device which is variable by movable casing;
    a display control unit for controlling one or more display units so as to be switched to display either one of a detailed navigation screen showing a route from a current position to a designated destination, or a simple navigation screen showing a direction toward the destination with respect to the current position, in accordance with the style detected by the style detection unit; and
    a direction calculation unit for calculating the direction to the destination with respect to the current position detected by the position detection unit in accordance with the direction detected by the direction detection unit, when the simple navigation screen is displayed by the display control unit;
    wherein the display control unit generates the simple navigation screen showing the direction calculated by the direction calculation unit, and displays the generated simple navigation screen in accordance with a forward direction based on the direction of the mobile terminal device detected by the direction detection unit.

2. The mobile terminal device according to claim 1, wherein the mobile terminal device is a folding-type mobile terminal device which forms either one of an open style and a closed style by two or more movable casing units, and comprises:
    a first display unit disposed to be viewable when the mobile terminal device is in the open style, and
    a second display unit disposed to be viewable when the mobile terminal device is in the closed style,
    wherein the style detection unit detects whether the mobile terminal device is in the open style or in the closed style based on the conditions of the casing units, and
    the display control unit displays the detailed navigation screen on the first display unit, and displays the simple navigation screen on the second display unit.

3. The mobile terminal device according to claim 1, further comprising a destination recognition unit for obtaining the position information about a designated destination,
    wherein the direction calculation unit calculates the direction to the destination with respect to the current position detected by the position detection unit and the position information about the destination obtained by the destination recognition unit.

4. The mobile terminal device according to claim 1, further comprising a direction coincidence detection unit for detecting whether or not the direction to the destination with respect to the calculated current position coincides with the direction detected by the direction detection unit,
    wherein the display control unit changes the display mode of the simple navigation screen based on the detection result of the direction coincidence detection unit.

5. The mobile terminal device according to claim 1, further comprising a distance calculation unit for calculating a distance from the current position to the destination,
    wherein the display control unit generates the simple navigation screen including indication of the distance calculated by the distance calculation unit.

6. The mobile terminal device according to claim 1, further comprising a navigation image acquisition unit for obtaining the detailed navigation images through a communication network, in the case that the display control unit displays the detailed navigation screen.

7. The mobile terminal device according to claim 1, wherein the direction detection unit detects the direction of the mobile terminal device by using an electronic compass.

8. The mobile terminal device according to claim 1, wherein the position detection unit detects the current position of the mobile terminal device by using a GPS.

9. A computer-readable recording medium storing a program for causing a computer configured to control a mobile terminal device having a navigation function, to realize functions of:
    detecting a style of the mobile terminal device which is variable by movable casing,
    controlling one or more display units so as to be switched to display either one of a detailed navigation screen showing a route from a current position to a designated destination, or a simple navigation screen showing a direction toward the destination with respect to the current position, in accordance with the detected style;
    calculating a direction to the destination with respect to the current position of the mobile terminal device, in accordance with the detected direction of the mobile terminal device, when the simple navigation screen is to be displayed;
    generating the simple navigation screen showing the calculated direction, and displaying the generated simple navigation screen in accordance with a forward direction based on the direction of the mobile terminal device.

* * * * *